[72] Inventor Jam.
     Cleveland, Ohio
[21] Appl. No. 876,464
[22] Filed Nov. 13, 1969
[45] Patented Dec. 7, 1971
[73] Assignee Clevite Corporation

[54] ELECTRO-OPTICAL MODULATOR
     22 Claims, 5 Drawing Figs.
[52] U.S. Cl. .................................... 350/150,
                                       350/152, 350/157
[51] Int. Cl. ............................................. G02f 1/26
[50] Field of Search ............................................. 350/147,
                                       150, 152, 157, 160

[56]              References Cited
            UNITED STATES PATENTS
3,402,002  9/1968  Eden ........................... 350/150
3,495,892  2/1970  Dailey ......................... 350/150

*Primary Examiner*—David Schonberg
*Assistant Examiner*—Paul R. Miller
*Attorney*—Eber J. Hyde ABSTRACT: An electro-optical modulator employing the linear electro-optic effect, also known as the Pockels effect, in potassium dihydrogen phosphate or other P-type crystal material has the optical faces of the crystal body cut at oblique angles to the optic axis. Electrodes are arranged so that when a potential difference is applied a component of the resulting field in the body is parallel to the optic axis. In a preferred form the optical faces are so oriented that a beam of light incident on one of the faces at Brewster's angle passes through the body parallel to the optic axis. Reflections are eliminated when the incident beam is linearly polarized with the electric vector parallel to the plane of incidence, and the electric field in the body is zero.

PATENTED DEC 7 1971
3,625,592
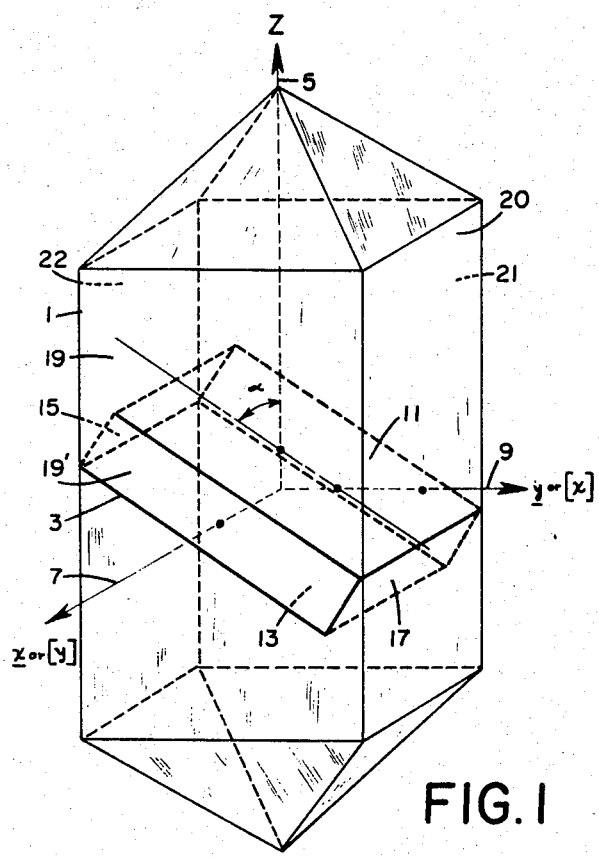
FIG.1
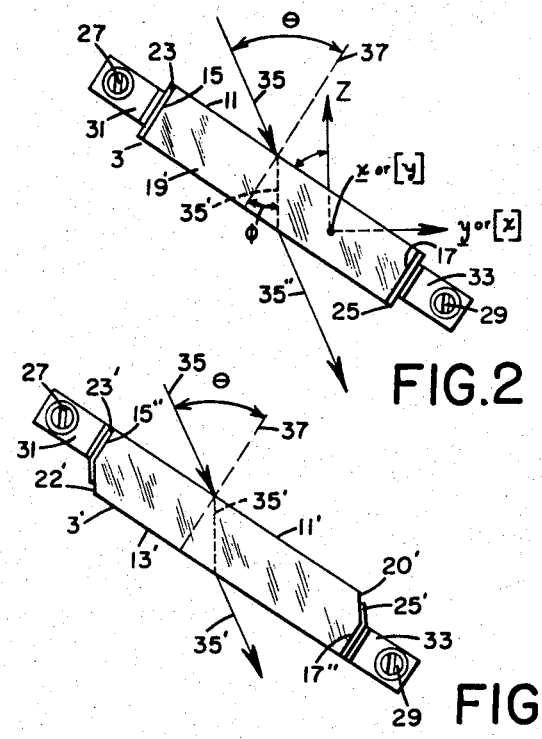
FIG.2
FIG.4
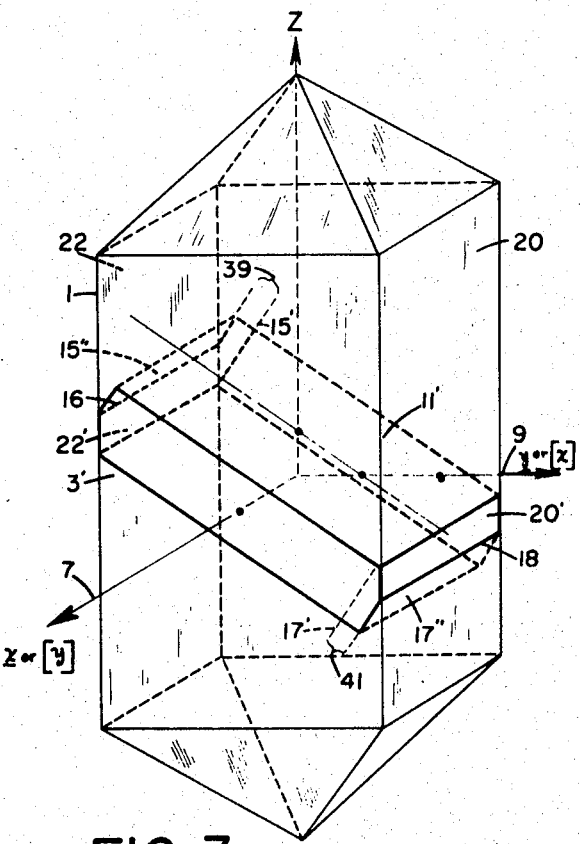
FIG.5
FIG.3
INVENTOR.
JAMES DONALD BEASLEY
BY
*E. Cer J. Hyde*
ATTORNEY

ELECTRO-OPTICAL MODULATOR

BACKGROUND OF THE INVENTION

1. Field of the Invention

This invention relates to electro-optical devices and more particularly to devices of the character which operate to modulate a polarized light beam by introducing a phase change in a component of the polarized beam as it passes through a body of transparent crystal when an electric field is applied to the body.

2. Description of the Prior Art

Electro-optical modulators employing the linear electro-optic effect, known as the Pockels effect, in crystals are well-known. Probably the most successful employ the longitudinal electro-optical effect in potassium dihydrogen phosphate or other P-type crystal materials. Prior art modulators of this type comprise a plate of P-type crystal material cut with optical faces perpendicular to the optic axis. The light beam to be modulated is directed to one of the optical faces at normal incidence and, therefore, parallel to the optic axis. The modulating electric field is applied parallel to the optic axis by means of electrodes supported in close proximity to the optical faces, in the path of the light beam. The electrodes, therefore, must be transparent, or semitransparent. Devices of this type are disclosed in U.S. Pat. Nos. 2,591,701 and 2,616,962, both granted to H. Jaffe.

P-type crystal material is preferred for electro-optical use because of excellent optical properties, large electro-optical coefficients, and because large, strain-free crystals are commercially available.

The longitudinal effect permits use of light beams of large cross-sectional area, and, since the beam traverses the crystal material substantially parallel to the optic axis, spurious modulation is not induced by temperature changes. The requirement for transparent electrodes is a disadvantage.

P-type crystals also have transverse electro-optical effects. A modulator employing the transverse effect is disclosed in U.S. Pat. No. 3,402,002 granted to D. D. Eden. The electrodes are attached to faces which are perpendicular to the optic axis, and therefore the modulating electric field is applied parallel to the optic axis as in longitudinal mode devices. The optical faces are parallel to the optic axis, and the light beam to be modulated is directed to one of them at normal incidence. Therefore, the beam traverses the device perpendicular to the optic axis. This arrangement obviates the use of transparent electrodes. However, since the light beam is not parallel to the optic axis it can be modulated by temperature changes due to the change in birefringence with temperature. Theoretically, this undesirable effect may be avoided by using two modulators in tandem in a temperature compensating arrangement, but in practice, adequately matched modulators are difficult to produce.

A difficulty with all prior art modulators employing P-type crystal material is the loss of light due to reflections at the optical faces. This is particularly objectionable when such modulators are employed as Q-switches in high-power lasers. Antireflection coatings have been unsatisfactory because of rapid deterioration under the action of the laser beam.

SUMMARY OF THE INVENTION

An object of this invention is to provide a body of P-type crystal material for use in modulating a beam of polarized light employing the longitudinal mode without requiring the use of transparent electrodes. This object is accomplished by providing the body of crystal material with a pair of surfaces, each forming an oblique angle with the optic axis, and providing means for applying an electric field to the body with a component parallel to the optic axis. A beam of light incident on one of the faces at a suitable angle may pass through the body parallel to the optic axis.

Another object of the invention is to provide an electro-optical light modulator employing P-type crystal material so constructed that reflections are eliminated or reduced. This object is accomplished by orienting the optical faces of the crystal body described in the preceding paragraph so that the angles of incidence are substantially Brewster's angles whereby reflections are avoided when the light beam is linearly polarized with electric vector parallel to the plane of incidence and the electric field is zero.

BRIEF DESCRIPTION OF THE DRAWINGS

FIG. 1 is an idealized drawing of a P-type crystal showing how a body or block may be cut therefrom in accordance with this invention.

FIG. 2 is a side view of an electro-optical device incorporating the crystal block shown in FIG. 1.

FIG. 3 is a view, similar to FIG. 1, showing a modified way of cutting a crystal block.

FIG. 4 is a side view of an electro-optical device incorporating the crystal block shown in FIG. 3.

FIG. 5 is a view, partly in section, of another modification of the present invention.

DESCRIPTION OF THE PREFERRED EMBODIMENTS

FIG. 1 shows, in idealized form, a crystal 1 grown from P-type crystal material. A block 3 may be cut from such a crystal for use in an electro-optical modulator according to this invention. As used in this specification, and in the appended claims, the expression "P-type crystal material" is intended to mean primary ammonium, phosphate ($NH_4H_2PO_4$), primary potassium phosphate, primary rubidium phosphate, the primary arsenates of ammonium, potassium and rubidium, isomorphous mixtures of any of these named compounds, and all other piezoelectrically active crystal materials isomorphous therewith.

The primary phosphates and arsenates are also known as dihydrogen phosphates and arsenates, respectively. The expression "P-type crystal material" also is intended to include crystals isomorphous with primary ammonium phosphate in which hydrogen is partly or fully replaced by deuterium.

In FIG. 1 the vertical axis 5 is the $z$ or optic axis of the crystal. Perpendicular to the $z$ axis and to each other are the $x$ and $y$ axes. Insofar as the present invention is concerned, the $x$ and $y$ axis designations are interchangeable. Accordingly, in FIG. 1, axis 7 may be called the $x$ axis, in which case axis 9 is the $y$ axis. Alternatively, axis 7 may be called the [$y$] axis, in which case axis 9 is called the [$x$] axis.

In constructing an electro-optical modulator according to this invention, a body or block 3 may be cut from crystal 1 with an optical face 11, forming an oblique angle $\alpha$ with the $z$ axis 5, and a second optical face 13, also forming an oblique angle with the $z$ axis. Generally, faces 11, 13 will be parallel, as shown in FIG. 1, but, as described in a later paragraph, different angles with the $z$ axis may be required in some cases. Face 11 may be substantially parallel to the $x$ or [$y$] axis, as shown in FIGS. 1 and 2. In this case, end faces 15, 17 preferably also are substantially parallel to the $x$ or [$y$] axis; and side faces 19', 21' preferably coincide with, or may be cut substantially parallel to faces 19 and 21 of crystal 1 so that they are substantially perpendicular to the $x$ or [$y$] axis. Alternatively, the block 3 may be rotated about the $z$ axis so that face 11 is at some other angle to the $x$ or [$y$] axis, depending on the application for the modulator, as described in a later paragraph. End faces 15, 17, and side faces 19', 21' preferably are substantially perpendicular to faces 11, 13 and preferably intersect the latter to give faces 11, 13 a substantially rectangular outline. When the block is oriented as shown in FIG. 1, it may be cut along line 12 to form two separate blocks having proportions generally suitable for use in the present invention.

Referring to FIG. 2, electrodes 23, 25 are supported in close proximity to end faces 15, 17 of crystal block 3. The electrodes may be in the form of metal plates held close to faces 15, 17 by means not shown, or they may be attached to the faces, as by an adhesive. Preferably, however, they are formed by vacuum deposition of metal directly on faces 15, 17 by techniques common in the piezoelectric art. One method, for example, is described in U.S. Pat. No. 2,497,666 granted to C. K. Gravley.

Terminals 27, 29 are electrically connected to electrodes 23, 25 respectively. One suitable means of connection is the use of strips of metal foil 31, 33 pressed against the electrodes, or soldered thereto, or attached by means of a conducting cement such as silver loaded epoxy.

When a potential difference is applied between terminals 27, 29 an electric field is established within the body 3 between electrodes 23, 25, and a component of the field is parallel to the $z$ axis 5.

In FIG. 2 the substantially parallel beam of polarized light which is to be modulated is indicated by line 35 representing a single ray of the beam. It is incident on face 11 at angle $\theta$, which is the angle of incidence, line 37 being normal to face 11 at the point of incidence. The beam passes through the body of crystal, as shown by line 35', at angle $\Phi$, which is the angle of refraction. The beam emerges from face 13, as shown by line 35''.

The angle of incidence $\theta$ is selected so that the refracted beam 35' is substantially parallel to the $z$ axis 5. When this is done, the device of FIG. 2 operates with the desirable characteristics of prior art parallel mode modulators without the disadvantage of requiring transparent electrodes. The operation may be explained as follows:

The beam of polarized light 35 entering the crystal body may be represented by two perpendicular amplitude vectors whose magnitudes vary sinusoidally at the frequency of the light waves, and at a given phase angle to each other. (For linearly polarized light, the phase angle between the two vectors is zero and the magnitudes may be equal or different; for circularly polarized light it is 90° with equal magnitudes; and for elliptical polarization it is between 0° and 90°, with equal or unequal magnitudes.) When the beam passes through the crystal body the two vectors are retarded due to the lower velocity of light through the crystal. When the beam within the crystal block is parallel to the optic axis, and the modulating electric field is zero, the retardation is the same for all vector orientations around the optic axis. Thus, both vectors are equally delayed and the emerging beam differs from the incident beam only in having experienced more delay than it would have in free space.

When the two vectors are oriented at 45° to the $x$ and $y$ axes of the crystal and an electric field is applied the delay of one component is increased and the delay of the other component is decreased. Each of the two components, therefore, is phase modulated, one advanced in phase, and the other retarded and, therefore, the resultant representing the emerging beam also is modulated.

If the incident beam is linearly polarized and the electric vector, with zero electric field applied to the modulator, is at 45° to the $x$ and $y$ axes, then one of the two components mentioned above is zero. In this case the emerging beam displays only phase modulation when an electric field is applied to the modulator.

If the incident beam is linearly polarized, and the electric vector is substantially parallel to the $x$ or $y$ axis, when the modulating field is zero, or if the incident beam is elliptically or circularly polarized, then the emerging beam will be the resultant of two components which are differentially delayed by applying an electric field. In this case, the modulation may, if desired, be converted to amplitude modulation by passing the emerging beam through an analyzer.

As pointed out earlier in this specification, a disadvantage of prior art electro-optical modulators employing P-type crystal material has been undesirable reflections of the beam at optical faces of the modulator body.

The modulator of the present invention may be constructed and used in a manner that avoids reflections when the modulation is zero, provided the light beam to be modulated is limited to a narrow band of wavelengths and is linearly polarized. To accomplish reflection-free operation it is necessary to satisfy several conditions;

1. The angle of incidence $\theta$ (FIG. 2) of the beam 35 at face 11 must be substantially Brewster's angle.
2. The electric vector of the incident beam 35 must be substantially parallel to the plane of incidence. If the beam to be modulated is elliptically polarized rather than linearly polarized, reflections may be reduced, but not eliminated, by orienting the beam so that the major axis of the ellipse is parallel to the plane of incidence.
3. The plane of incidence must be substantially parallel to the $z$ axis.
4. The angle $\alpha$ between the surfaces 11, 13, and the $z$ axis must be such that the refracted beam 35' is substantially parallel to the $z$ axis. It can be shown that the mathematically correct value for this angle is numerically equal to Brewster's angle.

Brewster's angle is that angle of incidence which would make the reflected beam, if it existed, perpendicular to the refracted beam. It depends on the indices of refraction of the crystal body and the surrounding medium. It is given by the formula:

$$\theta_b = \tan^{-1}(N_1/N_2)$$

where:
$\theta_B$ the Brewster's angle of incidence of the light beam in the medium surrounding the crystal body 3. $N_1$ is the ordinary index of refraction of the crystal material at the wavelength of the light to be modulated. $N_2$ is the refractive index of the medium surrounding the crystal body 7. The medium may be vacuum, air, another gas, or an insulating liquid.

For further explanation of Brewster's angle, reference may be had to a textbook on optics such as: Principles of Optics, M. Born and E. Wolf, Pergamon Press, 3rd Edition, pages 41 through 47.

Available data on the "ordinary" indices of refraction of P-type crystals are given in the following table.

| Wavelength, angstroms | $KD_2PO_4$ | $KH_2PO_4$ | $NH_4H_2PO_4$ | $KH_2AsO_4$ | $NH_4H_2AsO_4$ |
|---|---|---|---|---|---|
| 6,563 | 1.503 | 1.506 | 1.521 | 1.563 | 1.572 |
| 5,893 | 1.506 | 1.510 | 1.524 | 1.567 | 1.577 |
| 5,461 | 1.508 | 1.512 | 1.526 | | |
| 4,861 | 1.512 | 1.515 | 1.531 | 1.576 | 1.586 |
| 4,078 | 1.519 | 1.525 | 1.539 | | |
| 3,660 | | | 1.546 | | |
| 2,536 | | | 1.587 | | |
| 1,849.6 | | | 1.685 | | |

When a modulator according to this invention is designed for use in vacuum, or air or other gas (refractive index $N_2 = 1.000$), Brewster's angle, and therefore the required angle $\alpha$ between face 11 and 13 and the $z$ axis is approximately 57°. It varies slightly according to the refractive index of the crystal material. For the total range of refractive indices for the P-type crystals given in the above table, the angle falls within the limits of 56.4° to 59.3°. When the crystal material is potassium dihydrogen phosphate, or potassium dihydrogen phosphate with part or all of the hydrogen replaced by deuterium, and the range of wavelengths is limited to the visible spectrum, the required angle falls within the limits of 56.4° to 56.8°.

Sometimes it is desirable to operate the modulator immersed in a protective liquid, such as the Fluorocarbon liquids sold by 3M Company as Fluorochemical Inert Liquids. These have refractive indices in the range of 1.26 to 1.30. Modulators designed for reflection-free operation in such liquids require that the angle between face 11 or 13 and the $z$ axis be approximately 51°. For the total range of refractive indices for the P-type crystals given in the above table, the required angle falls within the limits of 49° to 53°.

If the block 3 is to be used with a medium of one refractive index in contact with face 11 and a medium of different refractive index in contact with face 13, then the Brewster angle for the beam incident on face 11 will be different than the Brewster angle for the beam emerging from face 13 and, accordingly, the angles between the faces 11 and 13 and the optic axis will be different.

As pointed out earlier in this specification, the plane of incidence must be substantially parallel to the $x$ or [$y$] axis. However, the orientation of the plane of incidence with respect to the $x$ and $y$ axes may be selected according to the requirements of use. For example, if the modulator is to be used to produce intensity modulation by passing the emerging beam through an analyzer, then, as discussed earlier, the electric vector preferably should be substantially parallel to the $y$ or [$x$] axis, when the modulation is zero. Since the vector must also be substantially parallel to the plane of incidence to avoid reflection, this requires that the plane be substantially parallel to the $y$ or [$x$] axis as shown in FIG. 1. This in turn requires that the optical faces 11, 13 be substantially parallel to the $x$ or [$y$] axis.

When simple phase modulation is desired, the plane of incidence should be at substantially 45° to the $x$ and $y$ axes, to place the electric vector at 45° to $x$ and $y$. This then requires that faces 11, 13 make substantially equal angles with the $x$ and $y$ axes.

It is known that the linear electro-optic effect is enhanced by substituting deuterium for hydrogen in the crystal structure. For example, the coefficient $r_{63t}$ identifying the longitudinal effect for an unrestrained crystal is about $10.5 \times 10^{-12}$ meters per volt for $KH_2PO_4$. When all of the hydrogen is replaced by deuterium, changing the formula to $KD_2PO_4$, the coefficient $r_{63t}$ is about $26.4 \times 10^{-12}$ meters per volt. This increase in the electro-optic effect is very desirable because the larger the coefficient, the lower the voltage which is required to produce the same degree of modulation. However, complete replacement of hydrogen by deuterium is difficult and expensive. When the hydrogen is only partially replaced the electro-optic coefficient has an intermediate value, depending on the percentage replacement. The formula may be written $K(H_{1-x}D_x)_2PO_4$, where $x$ is the fraction of the hydrogen which is replaced. A practical lower limit for $x$ is about 0.8.

The maximum size of the crystal body 3 that may be cut in the form of a rectangular parallelepiped from a given crystal is limited by the crystal dimensions. For example, in FIG. 1, for the thickness and inclination shown, the body 3 has the maximum possible length.

Additional length of optical face may be obtained if the end faces 15, 17 are allowed to depart from the preferred orientation described above. For example, instead of making them perpendicular to optical faces 11, 13, as shown in FIG. 1, they may coincide with crystal faces 20, 22. Alternatively, the intersection of a perpendicular end face with an optical face may be truncated by a major crystal face as shown in FIG. 3.

In FIG. 3, block 3' is the same as block 3 of FIG. 1 except that it is made slightly longer so that end face 15" intersects crystal face 22 along line 16, and end face 17" intersects crystal face 20 along line 18. Lines 15' and 17' show where the body would terminate if it were cut as in FIG. 1. The extra lengths of optical faces are indicated at 39 and 41.

FIG. 4 shows a modulator, similar to that of FIG. 2, but employing the block 3' of FIG. 3. Electrode 23' extends beyond the limit of end face 15" and covers a portion of truncating face 22'. Similarly, electrode 25' extends beyond end face 17" and is supported in close proximity to truncating face 20'. In other respects, FIG. 4 is similar to FIG. 2 and the operation of the devices shown is substantially the same. Sufficiently uniform modulating field may be developed in block 3' even though the electroded ends are not plane parallel surfaces.

It is not necessary to employ the end electrode arrangements of FIG. 2 or 4 to obtain the reflection-free operation provided by this invention. As an alternative, the optical faces may be provided with transparent or partially transparent electrodes. Such a modulator is shown in FIG. 5. It employs the crystal block 3' of FIG. 3. However, other end face configurations could be used. Electrode 43 shown in section, is supported adjacent to face 11' and electrode 45, also shown in section, is supported adjacent to face 13'. Apertures 47, 49 are provided in the electrodes for passage of the light beam.

When a voltage is applied between electrodes 43, 45 an electric field is established in crystal body 3'. Due to fringing, a component of the field is developed parallel to the $z$ axis within the body between the light apertures 47, 49. Accordingly, the operation is similar to that of the devices of FIGS. 2 and 4.

While there have been described what are considered to be the preferred embodiments of this invention, it will be obvious to those skilled in the art that various changes and modifications may be made therein without departing from the invention.

What is claimed is:

1. A body of P-type crystal material having a first pair of opposite surfaces, each surface of said pair forming an oblique angle with the $z$ axis of the crystal material; and having a second pair of opposite surfaces, each surface of said second pair intersecting the surfaces of said first pair; and two electrodes, each attached to a different one of said opposite surfaces of said second pair; the orientation of the surfaces of said second pair being such that when a potential difference is applied between the said two electrodes, a component of the resulting electric field within the body is parallel to the $z$ axis of the crystal material.

2. A body of P-type crystal material as described in claim 1 in which the surfaces of said first pair of surfaces are substantially parallel.

3. A body of P-type crystal material as described in claim 2 in which the surfaces of said first pair of surfaces are substantially parallel to the $x$ or [$y$] axis of the crystal material.

4. A body of P-type crystal material as described in claim 3 in which an intersection of a surface of said first pair of surfaces with a surface of said second pair of surfaces is truncated by a surface which is substantially parallel to the plane defined by the $z$ axis and the $x$ or [$y$] axis of the crystal material.

5. A body of P-type crystal material as described in claim 2 in which the surfaces of said first pair of surfaces form substantially equal angles with the $x$ and $y$ axes of the crystal material.

6. A body of P-type crystal material as described in claim 1 in which the P-type crystal material is $K(H_{1-x}D_x)_2PO_4$ with $x$ having a value greater than 0.8.

7. A body of P-type crystal material as described in claim 2 a vacuum or within a fluid having an index of refraction of 1.0 in which the oblique angle between said first pair of surfaces and the $z$ axis of the crystal material is in the range of 56.4° to 59.3°.

8. A body of P-type crystal material as described in claim 2 for use within a fluid having an index of refraction in the range 1.26–1.30 in which the oblique angle between said first pair of surfaces and the $z$ axis of the crystal material is in the range of 49° to 53°.

9. A body of P-type crystal material as described in claim 2 in which the P-type crystal material is $K(H_{1-x}D_x)_2PO_4$ with $x$ having a value greater than 0.8 and in which the oblique angle between said first pair of surfaces and the $z$ axis of the crystal material is in the range of 56.4° to 56.8°.

10. An electro-optical device for modulating a beam of polarized light comprising: a body of P-type crystal material having a first pair of opposite surfaces, each surface of the pair forming an oblique angle with the $z$ axis of the crystal material, said body being positioned and oriented so that the beam is incident on one of said first pair of surfaces and passes through the body substantially parallel to the $z$ axis of the crystal; and means for applying an electric field to the body with a component of the field parallel to the $z$ axis of the crystal.

11. An electro-optical device as described in claim 10 in which the plane of incidence is substantially parallel to the $y$ or [$x$] axis.

12. An electro-optical device as described in claim 10 in which the plane of incidence forms an angle of substantially 45 with the x and y axes.

13. An electro-optical device as described in claim 10 in which the angle of incidence is substantially Brewster's angle.

14. An electro-optical device as described in claim 13 in which the plane of incidence is substantially parallel to the y or [x] axis.

15. An electro-optical device as described in claim 13 in which the plane of incidence forms an angle of substantially 45 with the x and y axes.

16. An electro-optical device as described in claim 13 in which the means for applying an electric field comprise two electrodes, each supported in close proximity to a different one of said opposite surfaces of said first pair of surfaces, and each electrode has an aperture through which the beam of light enters and leaves the device.

17. An electro-optical device as described in claim 10 in which the body of crystal material has a second pair of opposite surfaces, each surface of the second pair intersecting said first pair of surfaces and the means for applying an electric field comprise two electrodes, each supported in close proximity to a different one of said opposite surfaces of said second pair of surfaces.

18. An electro-optical device for modulating a beam of polarized light comprising: a body of P-type crystal material having first, second, and third pairs of substantially parallel faces forming a substantially rectangular parallelpiped, said body being positioned and oriented so that:
   a. the beam of light is incident on one face of said first pair of faces substantially at Brewster's angle;
   b. the said first pair of faces form an angle with the z axis of the crystal material which numerically is substantially equal to Brewster's angle;
   c. the second pair of faces are substantially parallel to the z axis of the crystal material;
   and electrodes supported in close proximity to the faces of said third pair of faces.

19. An electro-optical device as described in claim 18 in which the said third pair of faces are substantially parallel to the x or [y] axis of the crystal material.

20. An electro-optical device as described in claim 19 in which the P-type crystal material is $K(H \quad D \quad)PO$ and x is greater than 0.8.

21. An electro-optical device as described in claim 18 in which the said first pair of faces form substantially equal angles with the x and y axes of the crystal material.

22. An electro-optical device as described in claim 21 in which the P-type crystal material is $K(H \quad D \quad)PO$ and x is greater than 0.8.

* * * * *